Figure 5:
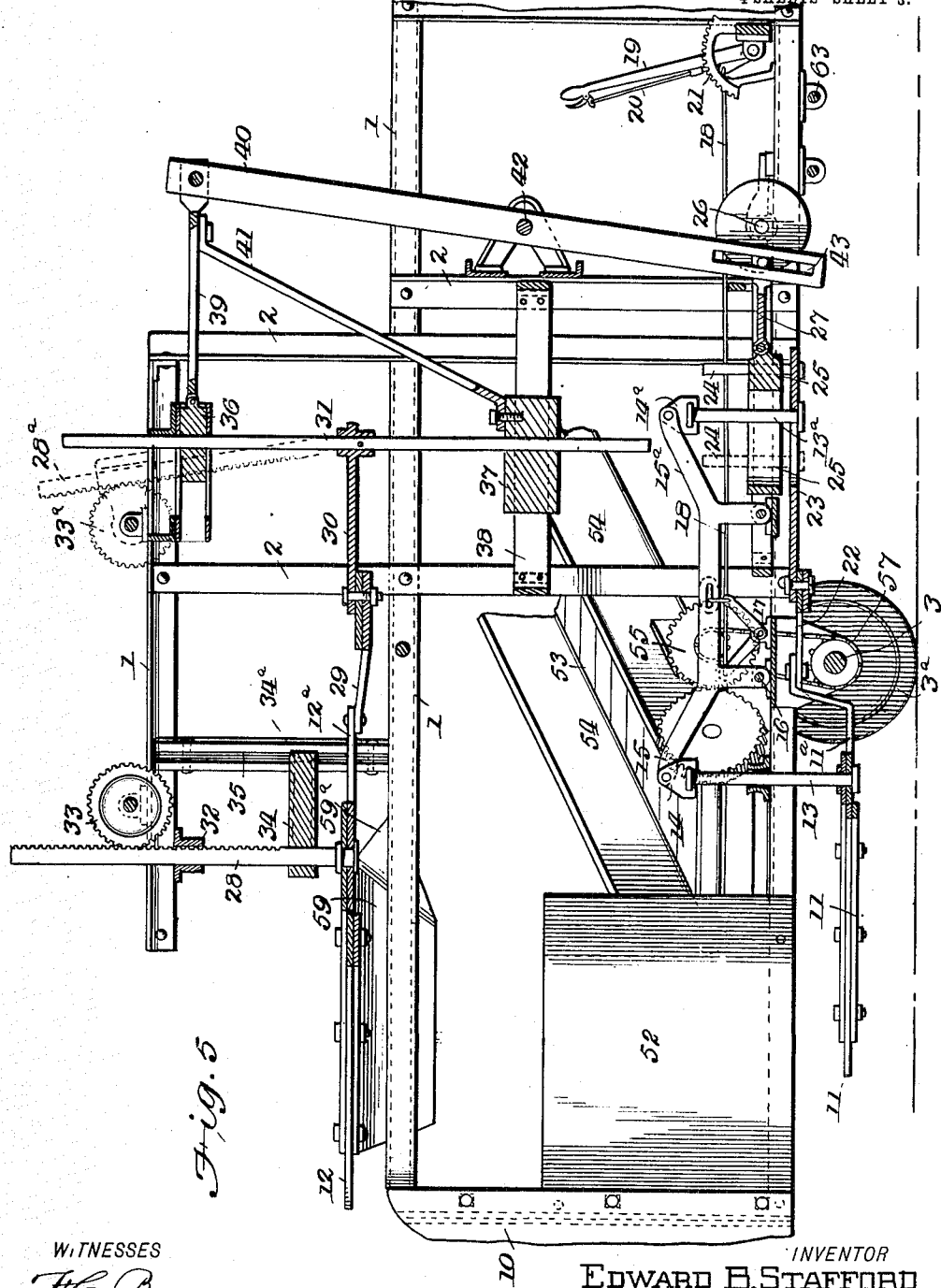

No. 860,499. PATENTED JULY 16, 1907.
E. B. STAFFORD.
SUGAR CANE AND CORN HARVESTER.
APPLICATION FILED SEPT. 10, 1906.
4 SHEETS—SHEET 1.
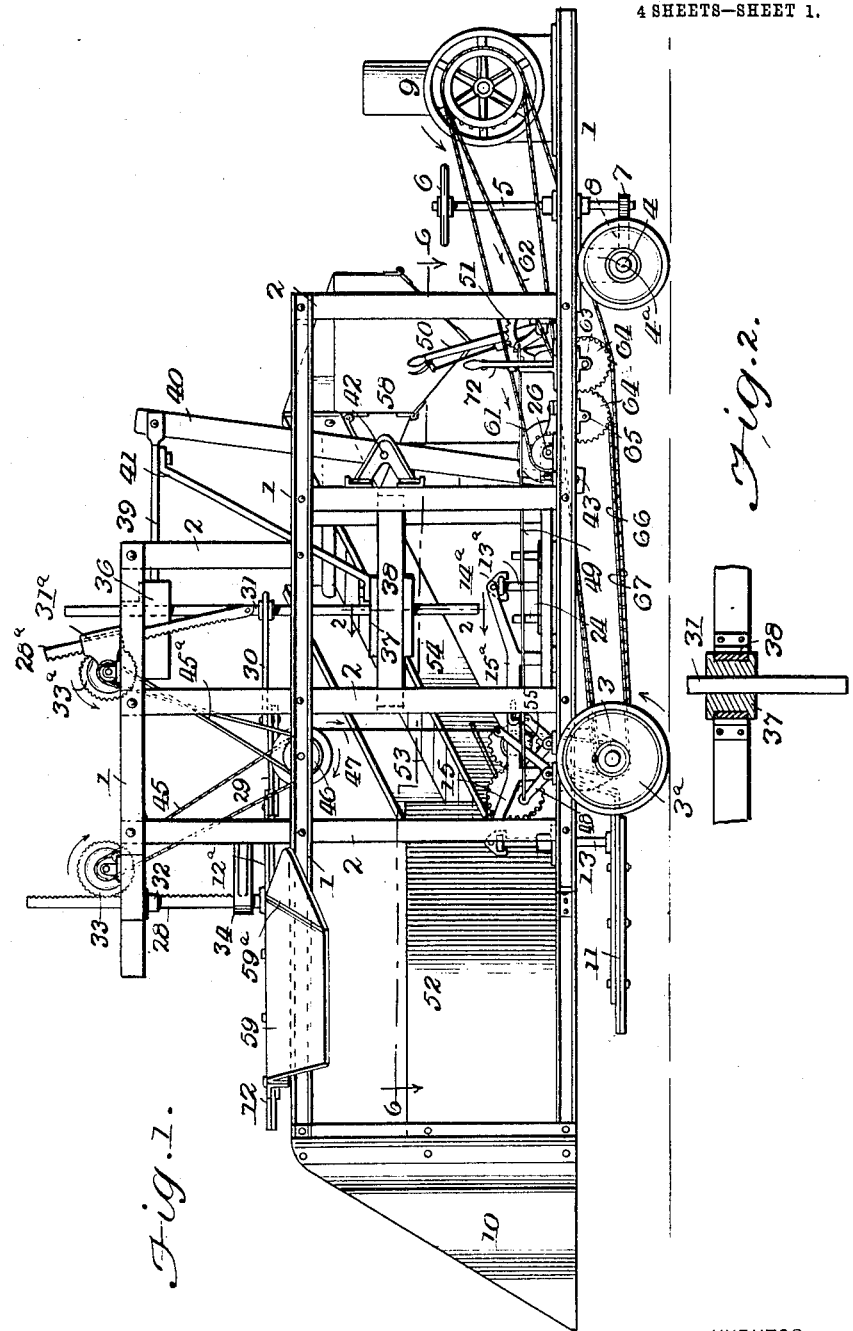
WITNESSES
INVENTOR
Edward B. Stafford
BY
ATTORNEYS No. 860,499. PATENTED JULY 16, 1907.
E. B. STAFFORD.
SUGAR CANE AND CORN HARVESTER.
APPLICATION FILED SEPT. 10, 1906.
4 SHEETS—SHEET 2.
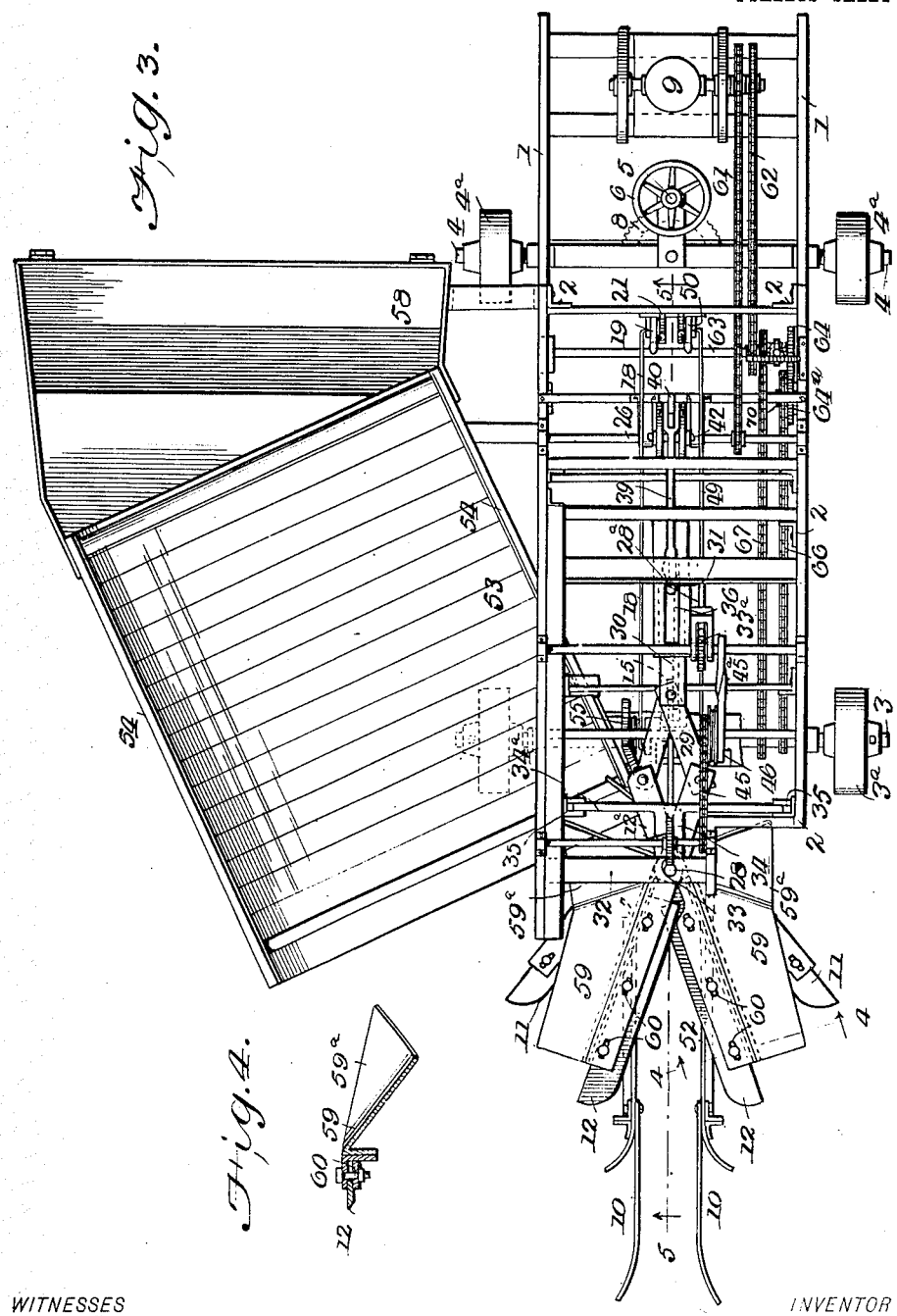
WITNESSES
F. C. Barry
Amos W. Hart
INVENTOR
EDWARD B. STAFFORD
BY Munn & Co.
ATTORNEYS No. 860,499. PATENTED JULY 16, 1907.
E. B. STAFFORD.
SUGAR CANE AND CORN HARVESTER.
APPLICATION FILED SEPT. 10, 1906.

4 SHEETS—SHEET 3.

WITNESSES
F. E. Barry
Amos W. Hart

INVENTOR
EDWARD B. STAFFORD
BY Munn & Co.
ATTORNEYS

No. 860,499. PATENTED JULY 16, 1907.
E. B. STAFFORD.
SUGAR CANE AND CORN HARVESTER.
APPLICATION FILED SEPT. 10, 1906.
4 SHEETS—SHEET 4.
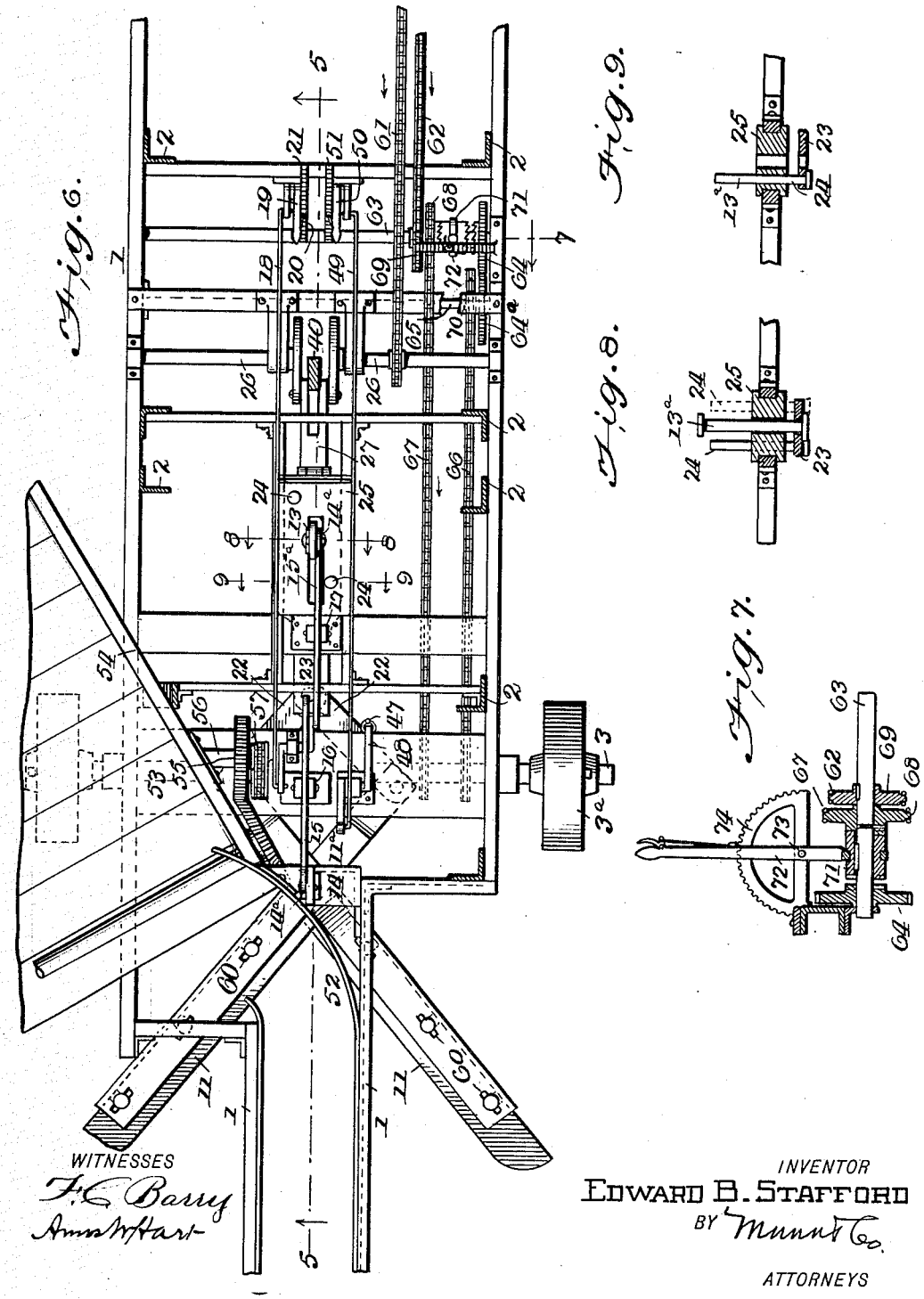
WITNESSES
INVENTOR
EDWARD B. STAFFORD
BY Munn & Co.
ATTORNEYS

UNITED STATES PATENT OFFICE.

EDWARD B. STAFFORD, OF NEW ORLEANS, LOUISIANA.

SUGAR-CANE AND CORN HARVESTER.

No. 860,499.          Specification of Letters Patent.          Patented July 16, 1907.

Application filed September 10, 1906. Serial No. 333,945.

*To all whom it may concern:*

Be it known that I, EDWARD B. STAFFORD, a citizen of the United States, and a resident of New Orleans, in the parish of Orleans and State of Louisiana, have made certain new and useful Improvements in Sugar-Cane and Corn Harvesters, of which the following is a specification.

My improved machine is adapted to cut and top sugar cane, corn, or similar crops and to deposit the same in bundles, piles, or stacks, or to deliver it into carts or other receptacles.

The details of construction, arrangement, and combination of parts are as hereinafter described and illustrated in the accompanying drawing, in which Figure 1 is a side view of the machine. Fig. 2 is a detail section on line 2—2 of Fig. 1 hereinafter referred to. Fig. 3 is a plan view of the machine. Fig. 4 is a detail section on the line 4—4 of Fig. 3. Fig. 5 is a longitudinal vertical section of the machine on the line 5—5 of Fig. 6. Fig. 6 is a horizontal longitudinal section of the machine. Fig. 7 is a cross section on the line 7—7 of Fig. 6. Fig. 8 is a section on the line 8—8 of Fig. 6. Fig. 9 is a cross section on the line 9—9 of Fig. 6.

As shown in the main figures of the drawing, the frame of the machine is constructed of longitudinal channel bars 1 and vertical angle bars 2, and mounted upon axles 3, 4, having wheels $3^a$, $4^a$, respectively. The front wheels $3^a$ are fast on the axle 3, while the rear wheels $4^a$ are loose on the axle 4, and the latter is pivoted—see Fig. 3—so that it may be shifted for guiding the machine, the shifting being effected by means of a vertical shaft 5 having a hand wheel 6 and a pinion 7 that engages a toothed segment 8 forming an attachment of the axle 4; see Figs. 1 and 3.

The front wheels $3^a$ serve to propel the machine when the front axle is driven from the motor 9, which is arranged on the rear of the machine as shown in Fig. 3. The connection between said axle and the motor will be presently described.

Guides 10 extend from the front of the machine and are arranged vertically and spaced apart and also flared at the front end to adapt them to receive the cane or corn stalks and support and guide them to the cutters. There are two sets of cutters, one set 11 being arranged underneath the frame and in front of the front wheels $3^a$, and in practice they will be worked as close to the ground as practicable, while the upper cutters 12 are arranged at a suitable height for severing the tops of the cane. Both sets of cutters are adapted for vertical adjustment by means which will now be described.

I will first describe the lower cutters 11. They consist of elongated blades which are pivoted together and adapted to work on each other in the manner of ordinary shear blades. The pivot is a vertical rod or shaft 13, see Figs. 1 and 5, which is adapted to slide vertically in a guide 14 fixed on the lower longitudinal bar of the frame. The upper end of this rod or shaft 13 is connected by a pivoted link with the front member of a three-armed oscillating lever 15 which is pivoted to the frame at 16 and arranged to rock in a vertical plane. The rear end or arm of such lever is loosely connected with the short arm 17 of a rocking elbow lever whose other arm is connected by a rod 18 with a hand lever 19; see Figs. 3, 5, 6. The lever 19 is pivoted and adapted to swing in a vertical plane and provided with a locking device 20 for engaging a toothed segment 21. The shanks $11^a$ of the cutters 11 are bent twice at an obtuse angle and extended upward as shown best in Fig. 5, and their rear ends are pivotally connected with links 22 whose rear ends are pivoted together as shown in Fig. 6, so that practically a lazy-tongs is formed as will be readily understood. A horizontal bar or plate 23, see Fig. 5, is connected with the rear pivot of the links 22 and it is obvious from this arrangement, if the said bar or plate 23 be reciprocated lengthwise it will effect the opening and closing of the shears or cutters 11. Arrangement is made for vertical adjustment of the plate 23 together with the lazy tongs and cutters 11 by means of a vertical bar $13^a$ which is connected by a link $14^a$ with a three-armed lever $15^a$, which is pivoted and connected with the elbow lever in the same manner as the first-named lever 15. Thus, by operating the hand lever 19 at the rear of the frame, both the levers 15, $15^a$, will be rocked on their pivots with the effect of sliding the rods or shafts 13, $13^a$, vertically, and thereby raising or lowering, as the case may be, the cutters 11 and their rear attachments.

For reciprocating the bar or plate 23 and thereby operating the shear cutters 11, I connect said bar by means of a rod 24 with a horizontal slide 25; see Figs. 5, 6, 8 and 9. The said rod 24 is fixed to the bar or plate 23 but adapted to slide freely in the slide 25. The latter is reciprocated from the crank shaft 26, see Fig. 6, it being connected therewith by a pivoted link 27. As shown, the shaft 26 is provided with a crank, and a link 27 is attached to the same.

Referring particularly to Figs. 3 and 5, the upper cutters or blades 12 are pivoted on the vertical rack bar 28 and the shanks $12^a$ of the same are pivotally connected by links 29 with a bar 30 which is fixed on a vertically slidable shaft or rod 31. Thus the cutters 12 are adapted to be operated in the same manner as the lower cutters 11 already described.

The required vertical adjustment of the upper cutters 12 is effected in the following manner. The pivot bar 28 of the cutters 12 works in a vertical guide 32 which is attached to the upper longitudinal bar of the frame and it is provided with teeth so that it constitutes a rack-bar adapted to engage a toothed wheel 33 journaled on the frame; see especially Fig. 1. In order to steady or support the lower portion of the rack bar 28 a bar 34 is fixed thereon in close approximity to the cutters 12 and is provided with lateral arms 34ª (see Fig. 3) that work in vertical guides 35 forming attachments of the front frame. Thus the bar 34 slides up or down in the channel guides 35 when the rack-bar 28 is adjusted vertically. The vertical rod or shaft 31, which is operatively connected with the lazy tongs that oscillate the upper cutters 12, is adapted to slide bodily forward and back, and this movement is effected by the following means. The rod 31 is adapted to slide in blocks 36 and 37, the same being arranged respectively above and below the point of attachment of the bar 30 which connects with the lazy tongs. The upper block 36 is arranged in horizontal slides supported from the top bar of the frame and the lower block 37 slides on parallel bars 38. The upper block 36 is connected by a pivoted link 39 with a long vertical lever 40, and an inclined brace 41 in turn connects the lower slide 37 with such link 39. The lever 40 is pivoted to the frame at 42 and its lower end is provided with a slot 43 to receive the crank or shaft 26 upon which is also pivoted the link 27 that connects with the lower slide 25. In this manner the lever 40 is oscillated by the revolution of the crank shaft 26, and thereby imparts reciprocation to the slide blocks 36, 37, which carry the rod or shaft 31 forward and backward and thus alternately open and close the cutters 12. The rack bar 28 upon which the cutters 12 are pivoted and the rod or shaft 31 connected with the lazy tongs 29, are adjusted vertically by the following means. As already indicated, the rack-bar 28 engages a toothed wheel 33. As shown in Fig. 1, a sprocket chain or band 45 runs from a wheel or pulley on the shaft of the wheel 33 to a corresponding wheel or pulley 46 from which in turn a band or sprocket chain 47 extends down to a pivoted elbow lever 48, and the shorter arm of the latter is connected by a rod or chain 49 with a hand lever 50 that is pivoted near the rear of the machine and provided with means for locking it to a segment 51; see also Figs. 3, 5, and 6. Thus, by adjustment of the lever 50 forward or back the elbow lever 48 will be rocked on its pivot and consequently the toothed wheel 33 will be rotated so as to raise or lower the rack-bar 28. The shaft 31 is raised or lowered at the same time correspondingly, through substantially similar means. Thus a rack-bar 28ª, see Figs. 1 and 5, is pivoted to the rod or shaft 31 and is adapted to slide in a cuff, or keeper, 31ª and to work in engagement with a toothed wheel 33ª. A band 45ª runs from a pulley or sprocket wheel on the shaft of the wheel 33ª to a corresponding pulley or wheel 46, which, as before described, is connected with the rocking elbow lever 48. The band 45ª is crossed as shown in Fig. 1.

The cane or corn stalks are severed near the root and also topped practically simultaneously, and as the machine advances the body portion of the same are forced rearward and guided laterally by a curved plate 52, see Fig. 6, upon an endless carrier 53, which, as shown in Fig. 1, is arranged in a frame 54 placed laterally of the main frame 1 of the machine and at an upward and rearward inclination thereto. The front inner corner of the frame 54 projects into the frame 1 as shown best in Fig. 6, and the endless traveling carrier 53 is operatively connected by gearing 55 with a transverse shaft 56 which is operatively connected by sprocket gearing 57 with the front axle 3 so as to be driven therefrom. The portions of the stalks which fall upon the carrier 53 are conveyed upward thereby and delivered into a hopper 58 which is attached to and suspended from the rear outer end of the carrier frame 54. The bottom of this hopper is hinged and otherwise constructed in such manner that it may be opened automatically, or by hand, to allow discharge of stalks accumulated therein.

The tops severed from the stalks fall laterally upon inclined guide plates 59, see Figs. 1, 3, 4, 5, the same constituting attachments of the upper blades or cutters 12 to which they are secured in such manner that they may be adjusted longitudinally or laterally thereon. For this purpose the guide plates are provided with longitudinal slots and the backs of the blades 12 are provided with open slots to allow adjustment of bolts 60 which secure the guides to the blades. The rear ends 59ª of the guides are bent upward and outward at an angle so as to prevent the tops of the stalks sliding too far rearward. It will be understood that the tops are thus guided onto the ground on each side of the cutters.

The motor 9 which may be of any suitable kind is connected by sprocket gearing 61 with the driving or crank shaft 26. The motor shaft is similarly connected by sprocket gearing 62 with a counter-shaft 63, see Figs. 1, 3, 6. The latter is connected by spur gearing 64, 64ª with a shaft 65 which is in turn connected by a sprocket chain 66 with the front axle 3. Another chain 67 similarly connects the front axle with a sprocket wheel 68, see Figs. 6 and 7, which is mounted loose on the shaft 63. The sprocket wheel 69 on which the chain 62 runs from the motor shaft, is fast on the shaft 63. Thus the latter is constantly driven by the motor. The chains 66 and 67 serve to drive the machine forward or back as may be required. The chain 66 runs on a sprocket wheel 70 that is loose on the shaft 65. Between a loose sprocket wheel 68 and a loose gear 64 is arranged a clutch member 71, see Fig. 7, which slides on a spline or feather and is adapted to engage corresponding half clutches formed on said wheels. The clutch 71 is operated by a hand lever 72 which is pivoted at 73 to a toothed segment 74 with which it may also be locked as required. When the clutch member 71 is engaged with the sprocket wheel 68, the machine is driven forward. Such engagement is shown in Figs. 6 and 7. On the other hand, if the clutch member 71 be slid to the left, see Figs. 6, 7, into engagement with the gear wheel 64, it is obvious that through the medium of the intermeshing gears 64 the machine will be driven backward, since the chain 66 will in that case be caused to travel in a direction reverse to the direction of the travel of the chain 67.

What I claim is—

1. A harvester for the purpose specified, comprising a main frame mounted upon wheels and having its front axle arranged for driving, a front guide for receiving the standing stalks, a laterally curved guide 52 arranged at the rear of such front guide, cutters for severing the stalks, a carrier upon which the severed stalks are guided and deposited, the same comprising a frame arranged on the side of the main frame and projecting upward at a slight angle, and also rearward at an acute angle to the said main frame, an endless traveling apron or belt arranged in the side frame, and gearing which operatively connects the apron with the driving member, substantially as described.

2. The combination, with a main wheeled frame, of cutters comprising shear blades and a vertically slidable rod or shaft upon which they are pivoted, devices connected with the blades for opening and closing them, a rearwardly extended bar or plate by which such devices are actuated, a vertically slidable rod or shaft connected with said bar, and lever mechanism connected with the two vertically slidable rods or shafts, and devices for operating such mechanism whereby the cutters and their rear actuating attachments are adjusted vertically as described.

3. The combination, with the wheeled frame, of cutters arranged at the front beneath the frame, a vertically slidable rod or shaft whereon said cutters are pivoted, devices in rear of the cutters and connected therewith for operating them, a second vertically slidable rod or shaft connected with said devices, and two pivoted levers arranged to oscillate vertically, their outer ends being loosely connected with the aforesaid rods or shafts, and means for operating said levers, the same including a rocking device connected with their inner adjacent ends and a hand lever and pull-rod connected with the rocking lever, substantially as described.

4. The combination, with a wheeled frame and shear cutters arranged beneath the front portion thereof, devices connected with the shanks of the cutters for opening and closing the latter, vertically adjustable rods connected with the cutters and said devices, a lever mechanism operatively connected with such vertical rods or shafts, and means for operating said mechanism for raising or lowering the cutters, substantially as described.

5. The combination, with the wheeled frame, of shear cutters arranged beneath the front portion thereof, a vertically slidable rod or shaft connected with the cutters and forming the pivot thereof, links connected with the shanks of the cutters, a rod or plate connected with the rear end of the links, a vertically slidable rod or shaft connected with such plate, means for adjusting such rods or shafts vertically, a slide block arranged horizontally, means for reciprocating it, and guide pins attached to the plate connected with the links and adjustable in the slide block, substantially as described.

6. The combination, with a wheeled frame, of topping cutters arranged in the front portion of said frame, a vertically slidable rack-bar connected with the cutters, and a toothed wheel for engaging the rack-bar, and a guide and support for said rack-bar, the same comprising a bar attached to the lower portion of the rack-bar and having lateral arms, and vertical guides arranged in the frame with which such arms engage, substantially as described.

7. The combination, with a wheeled frame, of topping cutters arranged in the front portion thereof, vertically slidable rack-bars connected with the cutters, devices arranged in rear of the cutters for operating them, a vertically slidable rod connected with said devices, means for moving said rod horizontally to operate the cutters, a rack-bar connected with said rod and slidable vertically in a suitable guide, a toothed wheel for engaging the same, sprocket mechanism connected with the two toothed wheels, and means for operating said mechanism whereby the cutters and their rear attachments may be adjusted vertically as required.

8. The combination, with the wheeled frame and shear cutters arranged in the front upper portion thereof, of a rack-bar forming the pivot of such cutters and adapted to slide vertically in suitable guides, a lazy tongs attachment in rear of said cutters, a vertically slidable rod operatively connected with the lazy tongs, a rack-bar connected with said rod, toothed wheels for engaging such rack bars, sprocket mechanism for operating the toothed wheels, a hand lever, rocking lever, and a rod connecting them, and means connecting the rocking lever with the sprocket mechanism whereby the cutters and their attachments may be raised or lowered as required.

9. The combination, with the wheeled frame, of shear cutters arranged in the front upper portion thereof, a lazy tongs attachment connected with the shanks of the cutters, a vertical rod connected with the lazy tongs, a horizontal slide through which the rod passes, a lever pivoted to oscillate in a vertical plane, means for imparting oscillation thereto, and a link connecting the upper end of the rod with the aforesaid slide, substantially as described.

10. The combination, with the wheeled frame, of shear cutters arranged in the front upper portion thereof, a vertically adjustable device connected with the cutters, means arranged in rear of, and connected with, the shanks of the cutters for operating them, the same including a rod or shaft which is movable both vertically and horizontally, two horizontal slides through which such rod or shaft passes, an oscillating lever connected with the slides for reciprocating them, and means for vertically adjusting the cutters and their attachments including the said rod or shaft, substantially as described.

11. The combination, with the wheeled frame, of topping cutters arranged in the front upper portion thereof, means for operating said cutters, the same including the member which is movable vertically and horizontally, means for imparting horizontal motion thereto, and means for vertically adjusting the cutters and their attachments, substantially as described.

EDWARD B. STAFFORD.

Witnesses:
HOWELL CARTER, Jr.,
JNO. R. McMAHON.